US006910846B1

(12) United States Patent
Doeden (10) Patent No.: US 6,910,846 B1
(45) Date of Patent: Jun. 28, 2005

(54) SLAT REPLACEMENT SYSTEM (76) Inventor: Kenneth Doeden, 617 160th Ave., Slayton, MN (US) 56172

( * ) Notice: Subject to any disclaimer, the term of this patent is extended or adjusted under 35 U.S.C. 154(b) by 23 days.

(21) Appl. No.: 10/194,864

(22) Filed: Jul. 12, 2002

(51) Int. Cl.7 .............................................. B66F 11/00
(52) U.S. Cl. ..................................... 414/589; 212/901
(58) Field of Search ............................... 414/590, 589, 414/680; 212/230, 901; 294/106

(56) References Cited

U.S. PATENT DOCUMENTS

| 710,391 | A | | 9/1902 | Haws | |
|---|---|---|---|---|---|
| 974,372 | A | | 11/1910 | Fullenkamp | |
| 3,469,816 | A | | 9/1969 | Blough et al. | |
| 3,656,729 | A | | 4/1972 | Borgert | |
| 4,659,276 | A | | 4/1987 | Billett | |
| 5,064,334 | A | * | 11/1991 | Cooley | 212/901 X |
| 5,120,186 | A | | 6/1992 | Jorgenson | |
| 5,193,873 | A | * | 3/1993 | Juliusz et al. | 294/106 |
| 5,758,785 | A | * | 6/1998 | Spinosa et al. | 212/901 X |
| 5,792,394 | A | | 8/1998 | Ellis | |

* cited by examiner

Primary Examiner—Donald W. Underwood (57) ABSTRACT

A slat replacement system for removing damaged slats and inserting new slats in an animal pen. The slat replacement system includes a base assembly for resting on a floor of the animal pen. A frame member is rotatably coupled to the base assembly. A motor assembly is operationally coupled to a drive assembly and is coupled to the frame member. The drive assembly is operationally coupled to the base assembly for rotating the frame member with respect to the base assembly. A lifting assembly is pivotally coupled to the frame member and operationally coupled to the drive assembly for pivoting the lifting assembly with respect to the frame member for lifting and moving of one of the slats. A control assembly is operationally coupled to the drive assembly for controlling rotation of the frame member with respect to the base assembly and pivoting of the lifting assembly.

20 Claims, 9 Drawing Sheets

SLAT REPLACEMENT SYSTEM

BACKGROUND OF THE INVENTION

1. Field of the Invention

The present invention relates to animal pen slat repair methods and more particularly pertains to a new slat replacement system for removing damaged slats and inserting new slats in an animal pen.

2. Description of the Prior Art

The use of animal pen slat repair methods is known in the prior art. U.S. Pat. No. 5,792,394 describes a method for repairing pen slats of an animal pen. Another type of animal pen slat repair method is U.S. Pat. No. 3,656,729 having a mold for casting a T-shaped slat useable in slotted floors. U.S. Pat. Nos. 974,372, 3,469,816 and 710,391 each have a mold for forming a T-shaped slat for use in animal pens. U.S. Pat. Nos. 4,659,276 and 5,120,186 each have an apparatus for handling loads.

While these devices fulfill their respective, particular objectives and requirements, the need remains for a system that includes certain improved features allow for damaged slats to be removed and replaced with new slats.

SUMMARY OF THE INVENTION

The present invention meets the needs presented above by providing a base assembly that distributes weight over a greater area to prevent the slat replacement system from breaking through the damaged slats.

Still yet another object of the present invention is to provide a new slat replacement system that allows for lifting and repositioning of the slat to be removed or replaced.

To this end, the present invention generally comprises a base assembly being designed for resting on a floor of the animal pen. A frame member is rotatably coupled to the base assembly. A motor assembly is operationally coupled to a drive assembly whereby the motor assembly is for actuating the drive assembly. The motor assembly and the drive assembly are coupled to the frame member. The drive assembly is operationally coupled to the base assembly whereby the drive assembly rotates the frame member with respect to the base assembly when the drive assembly is actuated by the user. A lifting assembly is pivotally coupled to the frame member. The lifting assembly is operationally coupled to the drive assembly whereby the drive assembly is for pivoting the lifting assembly with respect to the frame member. The lifting assembly is designed for being coupled to one of the slats for facilitating lifting and moving of one of the slats. A control assembly is operationally coupled to the drive assembly. The control assembly actuates the drive assembly for controlling rotation of the frame member with respect to the base assembly and pivoting of the lifting assembly with respect to the frame member when the control assembly is actuated by a user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new slat replacement system embodying the principles and concepts of the present invention and generally designated by the reference numeral 10 will be described.

As best illustrated in FIGS. 1 through 9, the slat replacement system 10 generally comprises a base assembly 11 being designed for resting on a floor of the animal pen. A frame member 12 is rotatably coupled to the base assembly 11.

A motor assembly 13 is operationally coupled to a drive assembly 14 whereby the motor assembly 13 is for actuating the drive assembly 14. The motor assembly 13 and the drive assembly 14 are coupled to the frame member 12. The drive assembly 14 is operationally coupled to the base assembly 11 whereby the drive assembly 14 rotates the frame member 12 with respect to the base assembly 11 when the drive assembly 14 is actuated by the user.

A lifting assembly 15 is pivotally coupled to the frame member 12. The lifting assembly 15 is operationally coupled to the drive assembly 14 whereby the drive assembly 14 is for pivoting the lifting assembly 15 with respect to the frame member 12. The lifting assembly 15 is designed for being coupled to one of the slats for facilitating lifting and moving of one of the slats.

A control assembly 16 is operationally coupled to the drive assembly 14. The control assembly 16 actuates the drive assembly 14 for controlling rotation of the frame member 12 with respect to the base assembly 11 and pivoting of the lifting assembly 15 with respect to the frame member 12 when the control assembly 16 is actuated by a user.

Figure 5:
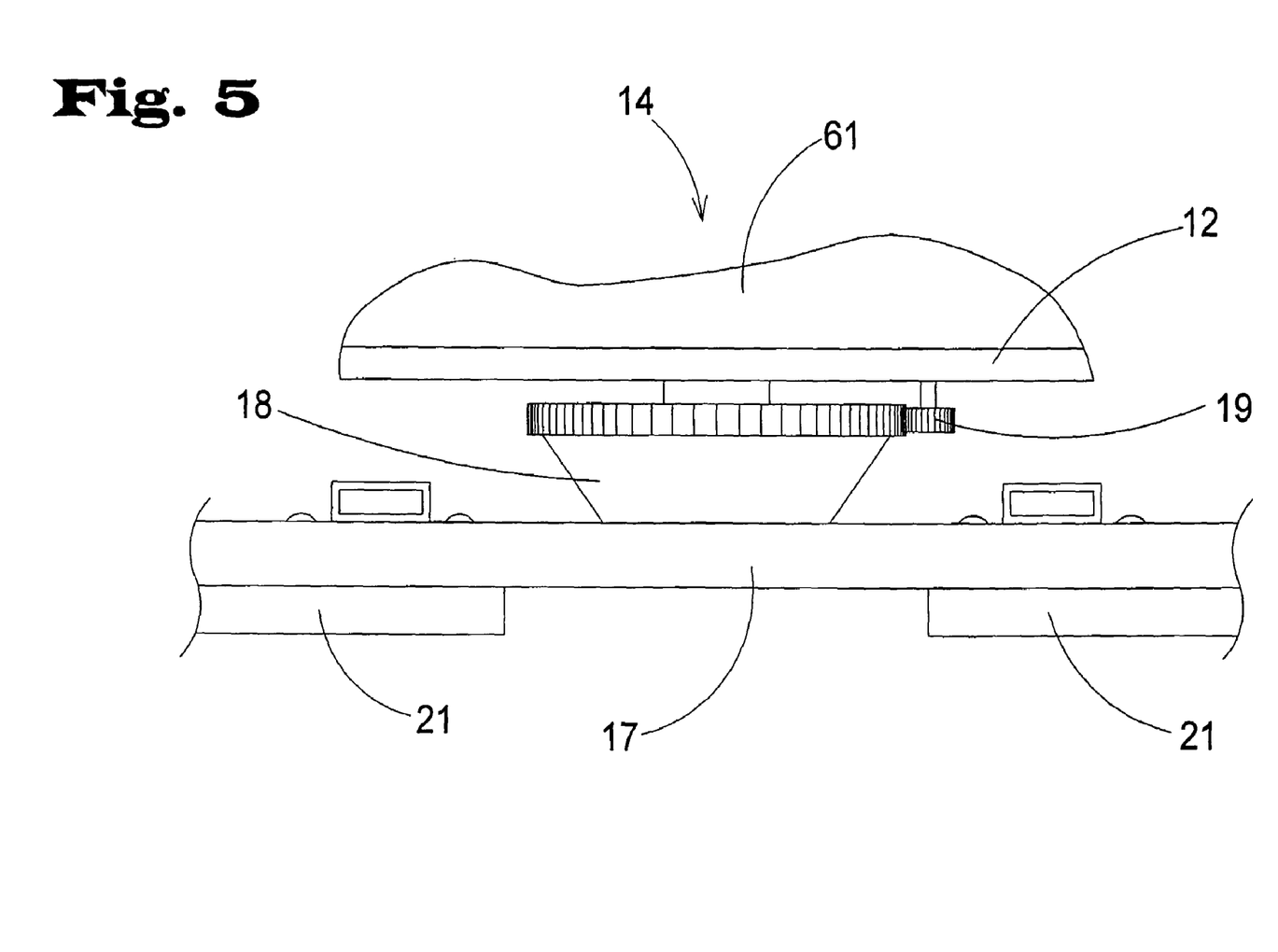
FIG. 5 is a side view of the transition cog wheel of the present invention.

The base assembly 11 comprises a base plate 17 and a transition cog wheel 18. The transition cog wheel 18 is coupled to the base assembly 11. The transition cog wheel 18 is rotatably coupled to the frame member 12. The drive assembly 14 comprises a rotational cog wheel 19 whereby the rotational cog wheel 19 is rotatable with respect to the frame member 12. The rotational cog wheel 19 of the drive assembly 14 is operationally coupled to the transition cog wheel 18 whereby rotation of the rotation cog wheel rotates the frame member 12 with respect to the base plate 17.

Figure 7:
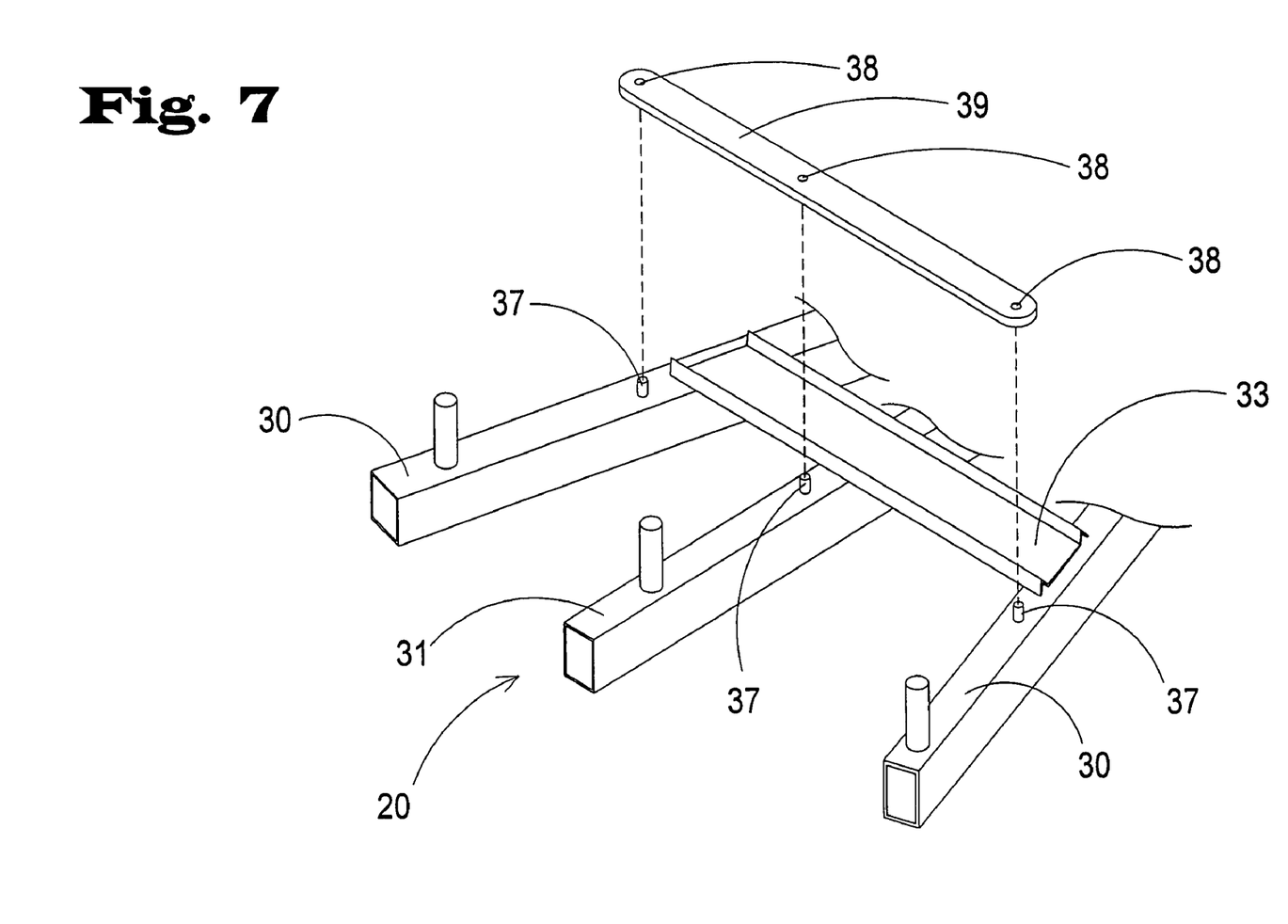
FIG. 7 is an exploded perspective view of the support members of the present invention.

The base assembly 11 comprises a plurality of sets of support members 20. Each of the sets of support members 20 is coupled to the base plate 17 whereby one of the sets of support members 20 is positioned opposite the other of the support members. Each of the sets of support members 20 is designed for engaging the floor of the animal pen for supporting the base plate 17 from the floor of the animal pen.

Figure 8:
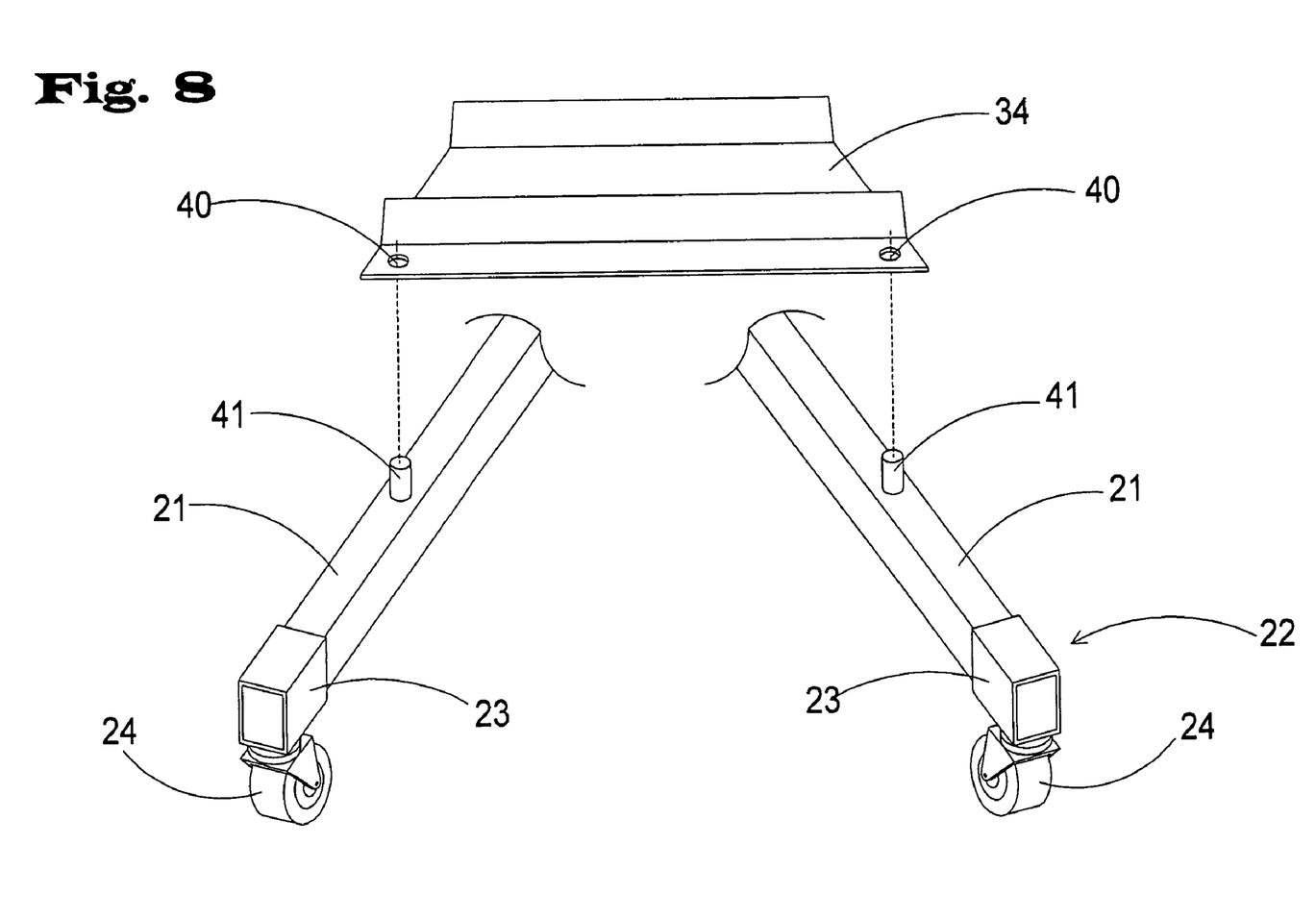
FIG. 8 is an exploded perspective view of a pair of the leg members of the present invention.
Figure 9:
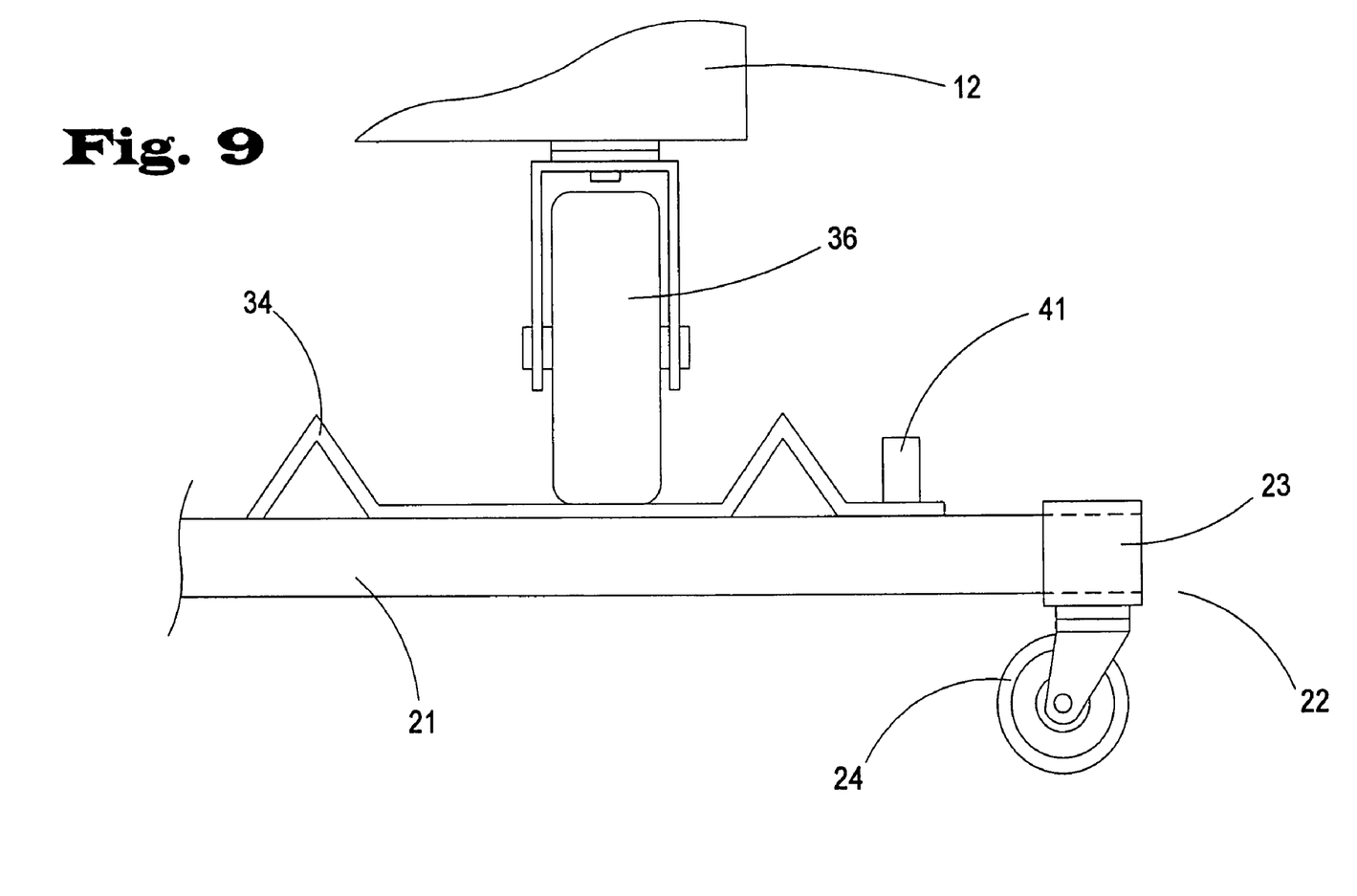
FIG. 9 is a side view of one of the leg members of the present invention.

The base assembly 11 comprises a plurality of leg members 21. Each of the leg members 21 is pivotally coupled to the base plate 17 whereby each of the leg members 21 is pivotal between a stored position and a deployed position. Each of the leg members 21 is positioned between the sets of support members 20. Each of the leg members 21 is designed for engaging the floor of the animal pen when each of the leg members 21 is in the deployed position for providing support for the base plate 17. Each of a plurality of caster assemblies 22 is selectively coupled to one of the leg members 21 of the base assembly 11. Each of the caster assemblies 22 comprises a receiving sleeve 23 and a caster portion 24. The receiving sleeve 23 selectively receives the associated one of leg members 21 when the leg members 21 are in the stored position and being pivoted to the deployed position. The caster portion 24 is coupled to the receiving sleeve 23 such that the caster portion 24 facilitates movement of the associated one of leg members 21 across the floor of the animal pen. Each of the caster assemblies 22 is selectively removable from the associated one of the leg members 21 to permit the leg members 21 to directly contact the floor of the animal pen when the leg members 21 are in the deployed position.

Figure 1:
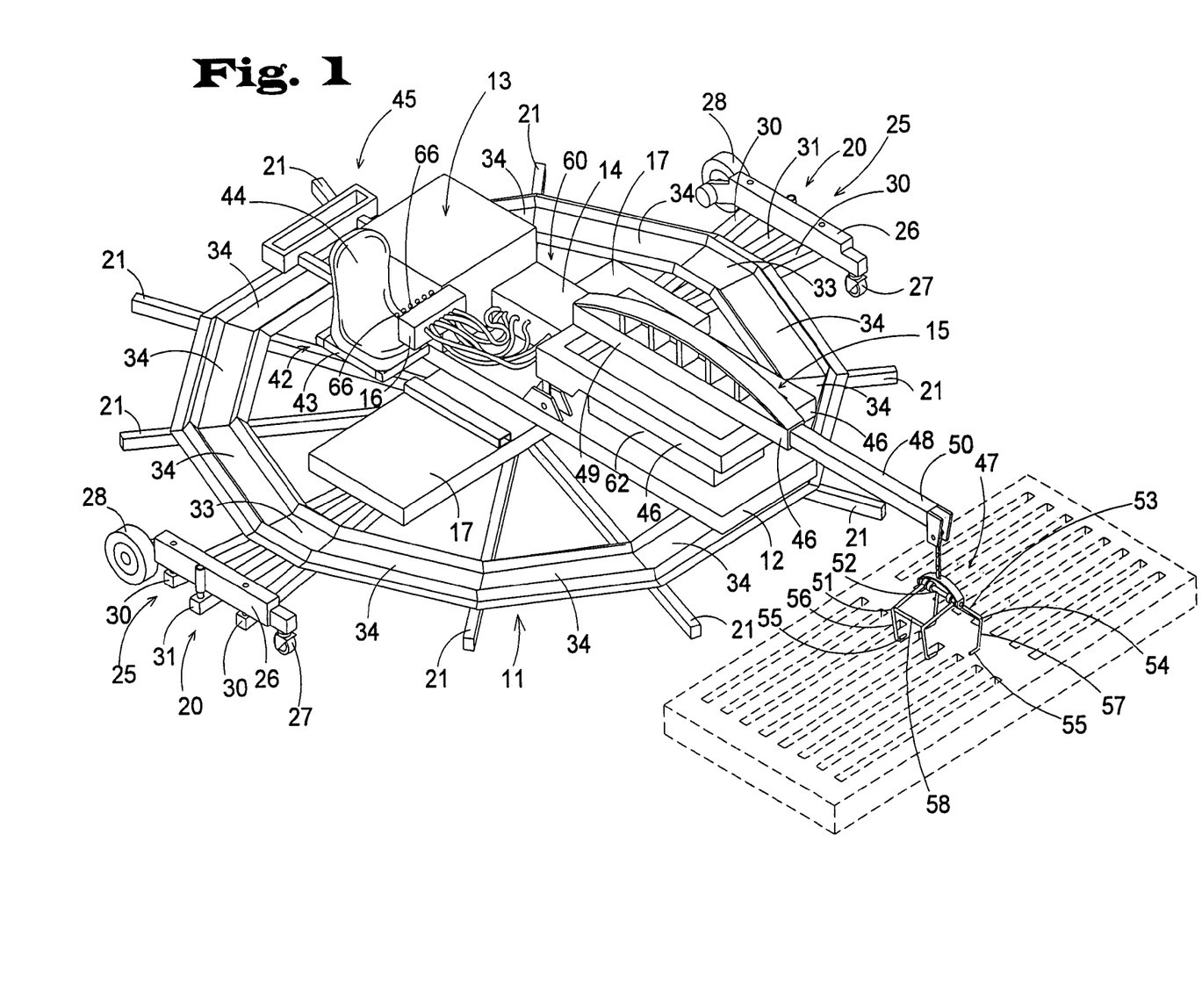
FIG. 1 is a perspective view of a new slat replacement system according to the present invention shown in use.
Figure 2:
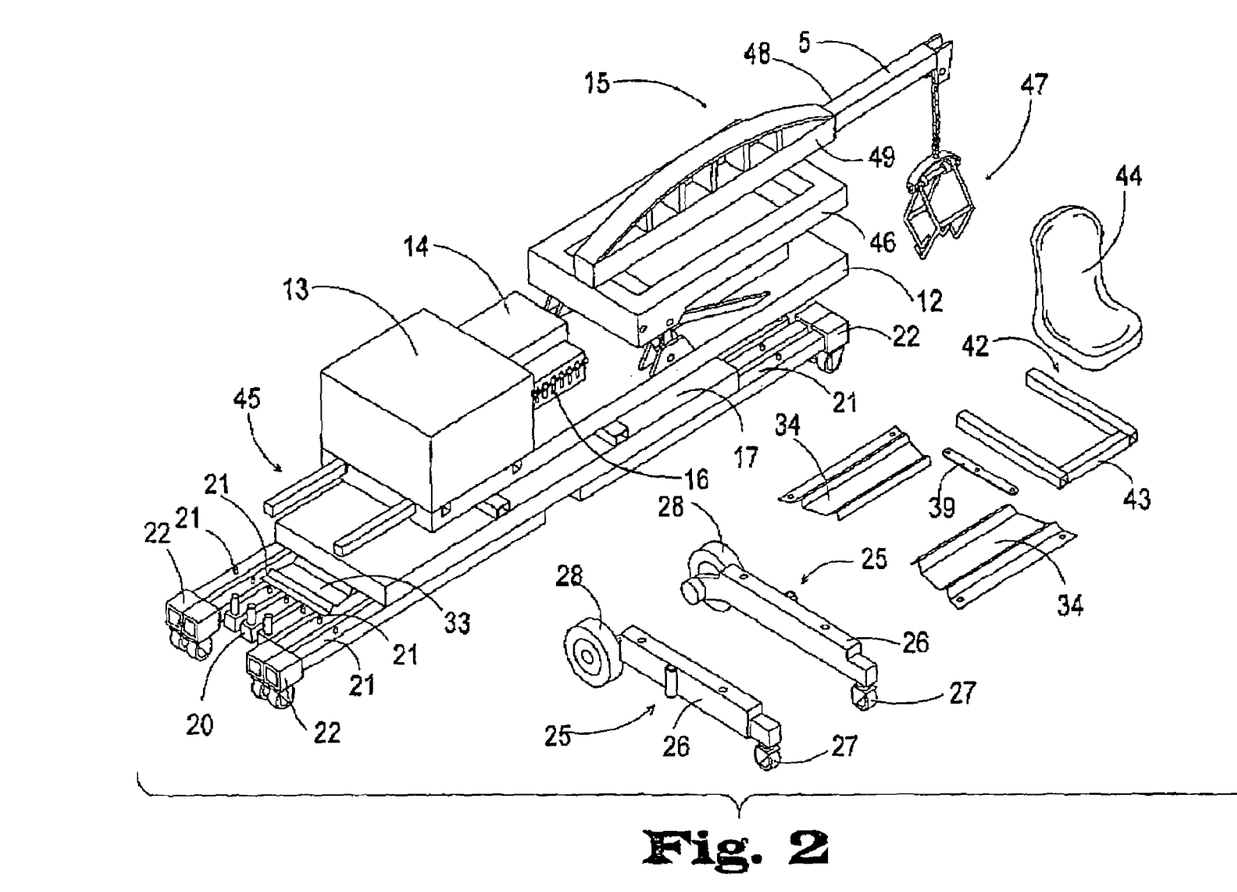
FIG. 2 is an exploded perspective view of the present invention.
Figure 3:
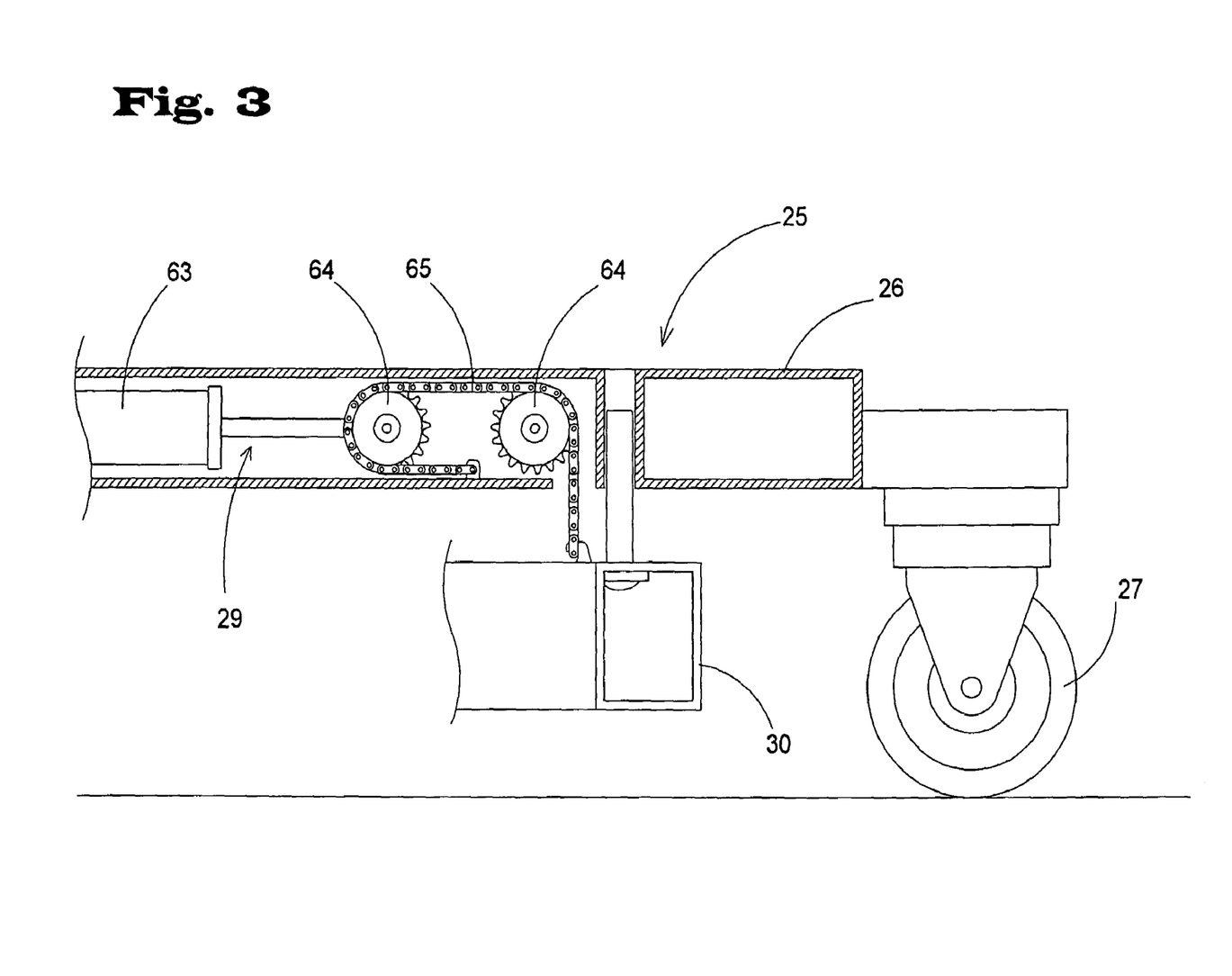
FIG. 3 is a cross-sectional view of the positioning assembly of the present invention.

The base assembly 11 comprises a plurality of positioning assemblies 25. Each of the positioning assemblies 25 is coupled to one of the sets of support members 20. Each of the positioning assemblies 25 is for vertically positioning the associated one of the sets of support members 20 with respect to the floor of the animal pen for allowing repositioning of the base plate 17.

Each of the positioning assemblies 25 comprises a span member 26, a roller portion 27 and a wheel portion 28. The span member 26 is coupled to the associated one of the sets of support members 20. The roller portion 27 is pivotally coupled to the span member 26. The wheel portion 28 is rotatably coupled to the span member 26 opposite the roller portion 27. The wheel portion 28 is operationally coupled to the drive assembly 14 whereby the drive assembly 14 rotates the wheel portion 28 for moving the base plate 17 across the floor of the animal pen.

Each of the positioning assemblies 25 comprises a raising assembly 29. The raising assembly 29 is coupled to the span member 26 of the associated one of the positioning assemblies 25. The raising assembly 29 is operationally coupled to at least one of the support members of the associated one of the sets of support members 20 whereby the raising assembly 29 selectively lifts the associated one of the sets of supports members with respect to the floor in the animal pen. The raising assembly 29 is operationally coupled to the drive assembly 14 whereby the drive assembly 14 actuates the raising assembly 29 to vertically adjust the associated one of the sets of support members 20 with respect to the floor of the animal pen when the drive assembly 14 is actuated by the user.

Each of the sets of support members 20 comprises a pair of end support members 30 and a center support member 32.

Each of the end support members 30 is pivotally coupled to the base plate 17 whereby each of the end support members 30 are pivotal between a deployed position and a stored position. The center support member 32 is coupled to the base plate 17 whereby the center support member 32 is positioned between the end support members 30. The end support members 30 and the center support member 32 are designed for selectively engaging the floor of the animal pen when the end support members 30 are in the deployed position. When the end support members 30 and the leg members 21 are positioned in the stored position the system can be easily positioned through a door leading into the animal pen.

The base assembly 11 comprises a pair of base channel members 33 and a plurality side channel members 34. Each of the base channel members 33 is coupled to one of the sets of support members 20. Each of the channel members is selectively coupled to at least one of the leg members 21 when the leg members 21 are in the deployed position. The base channel members 33 and the side channel members 34 form a guide track 35 for receiving a dolly wheel 36 rotatably coupled to the frame member 12 for facilitating rotation of the frame member 12 with respect to the base assembly 11 when the leg members 21 are in the deployed position. Each of the end support members 30 and the center support member 32 has a peg member 37. The peg member 37 of the end support members 30 and center member each being insertable into a peg aperture 38 of an alignment member 41 39 such that the alignment member 41 39 is for maintaining the orientation of the end support members 30 and the center support member 32 when the end support members 30 are in the deployed position. Each of the side channel members 34 comprising a pair of alignment apertures 40. Each of the alignment apertures 40 selectively receives an alignment member 41 39 of an associated one of the leg members 21 for maintaining alignment of the leg members 21 when the leg members 21 are in the deployed position.

The control assembly 16 is rotatably coupled to the frame member 12 whereby the control assembly 16 is rotatable between a deployed position and a stored position. The stored position of the control assembly 16 is defined by a longitudinal axis of the control assembly 16 is positioned substantially parallel to a longitudinal axis of the frame member 12. The deployed position of the control assembly 16 is defined by the longitudinal axis of the control assembly 16 being substantially perpendicular to the longitudinal axis of the frame member 12 whereby the control assembly 16 is designed for being accessed by the user for controlling the drive assembly 14 when the control assembly 16 is in the deployed position.

A seating assembly 42 is selectively coupled to the frame member 12. The seating assembly 42 extends outwardly from the frame member 12. The seating assembly 42 is designed for receiving the user for positioning the user adjacent the control assembly 16. The seating assembly 42 comprises a seat frame 43 and a seat member 44. The seat frame 43 is selectively coupled to the frame member 12. The seat member 44 is selectively coupled to the seat frame 43 opposite the frame member 12 whereby the seat member 44 is adjustable for positioning the user with respect to the control assembly 16.

A balancing assembly 45 is slidably coupled to the frame member 12 opposite the lifting assembly 15. The balancing assembly 45 is operationally coupled to the drive assembly 14 whereby the balancing assembly 45 is adjustable with respect to the frame member 12. The balancing assembly 45 is designed for receiving weights whereby the balancing assembly 45 is for balancing the weight of one of the slats when the lifting assembly 15 is lifting the associated one of the slats.

Figure 6:
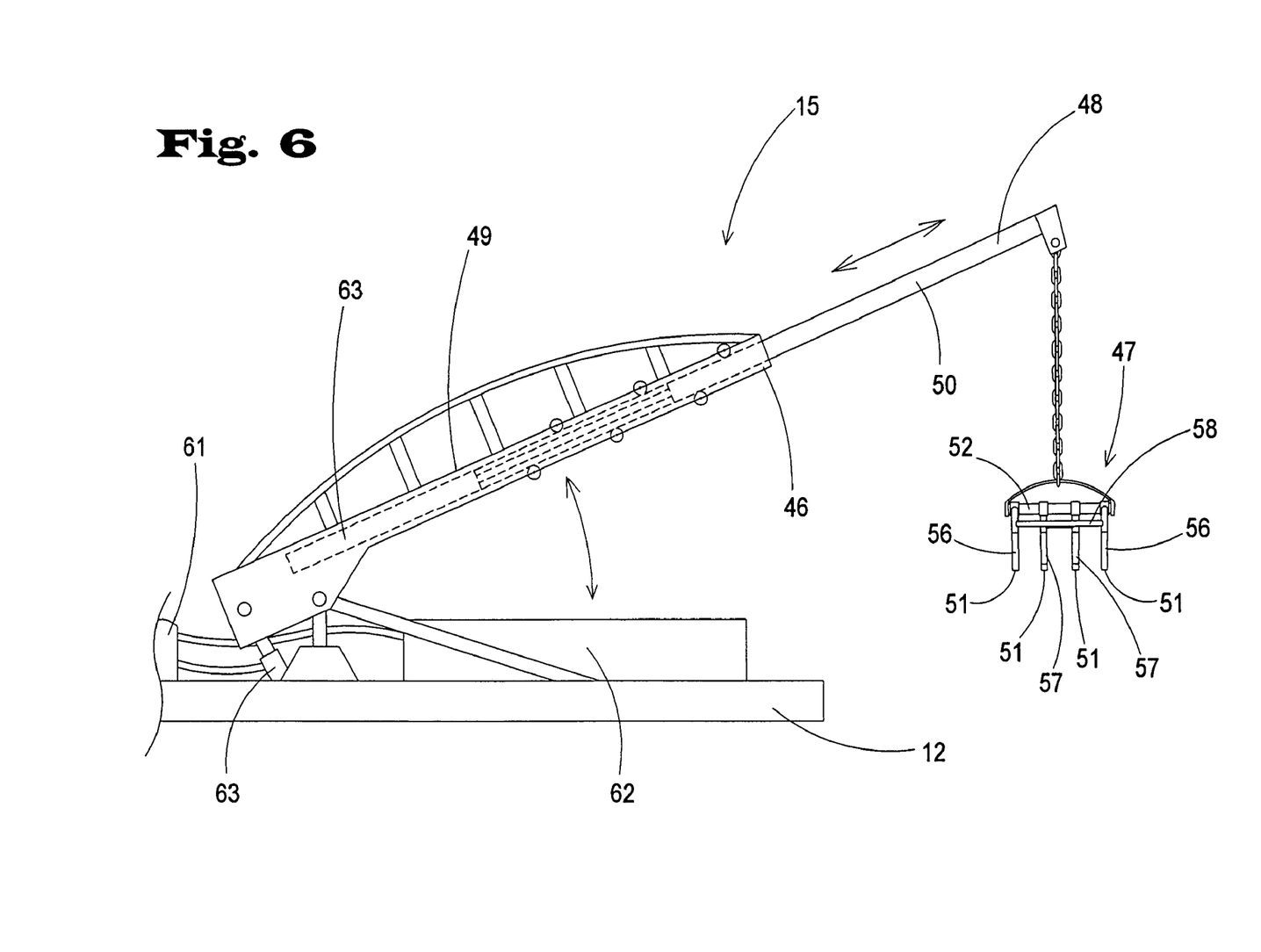
FIG. 6 is a side view of the lifting assembly of the present invention.

The lifting assembly 15 comprises a lifting frame 46. The lifting frame 46 is pivotally coupled to the frame member 12. The lifting frame 46 is operationally coupled to the drive assembly 14 whereby the drive assembly 14 pivots the lifting frame 46 with respect to the frame member 12 when the drive assembly 14 is actuated by the user. The lifting frame 46 is designed for lifting and lowering one of the slats when the lifting frame 46 is pivoted with respect to the frame member 12.

Figure 4:
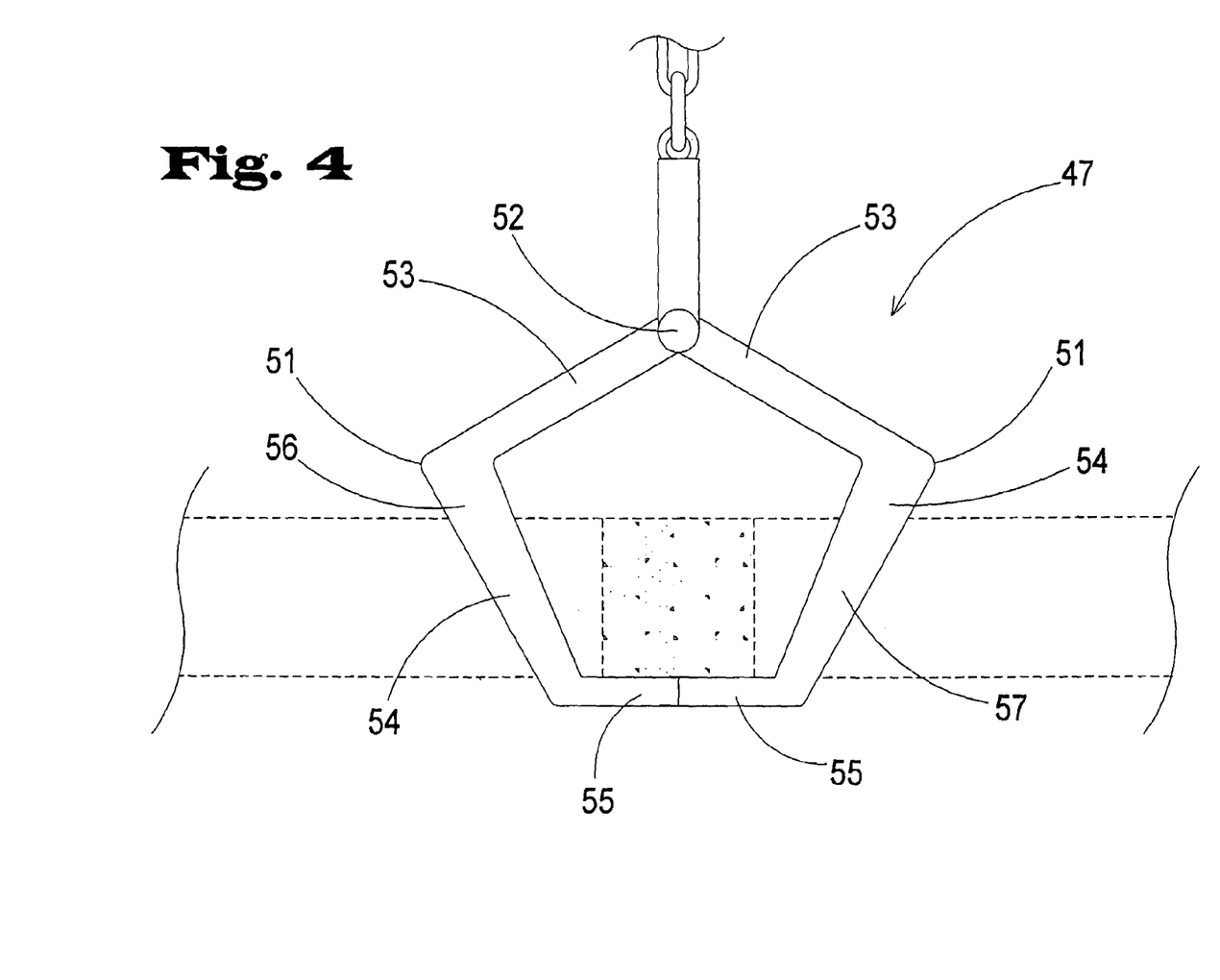
FIG. 4 is a side view of the clamping assembly of the present invention.

The lifting assembly 15 comprises a clamping assembly 47. The clamping assembly 47 is coupled to an arm portion 48 of the lifting assembly 15 coupled to the lifting frame 46. The clamping assembly 47 is designed for engaging one of the slats for securing one of the slats to the lifting assembly 15 for lifting and lowering one of the slats.

The arm portion 48 of the lifting assembly 15 comprises a sleeve member 49 and a boom member 50. The sleeve member 49 slidably receives the boom member 50 whereby the boom member 50 is telescopic from the sleeve member 49. The boom member 50 is operationally coupled to the drive assembly 14 for selectively sliding the boom member 50 with respect to the sleeve member 49 for changing the distance between the frame member 12 and one of the slats when the drive member is actuated by the user.

The clamping assembly 47 of the lifting assembly 15 comprises a plurality of finger portions 51 and a pivot rod 52. The finger portions 51 are pivotally coupled to the pivot rod 52. Each of the finger portions 51 is designed for extending through one of a plurality of slots in one of the slats and engaging a center portion of the associated one of the slats for securing the associated one of the slats to the lifting assembly 15.

Each of the finger portions 51 of the of clamping assembly 47 comprises a proximal member 53, a medial member 54 and a distal member 55. The proximal member 53 is pivotally coupled to the pivot rod 52 of the clamping assembly 47. The medial member 54 is coupled to the proximal member 53 opposite the pivot rod 52. The distal member 55 is coupled to the medial member 54 opposite the proximal member 53 whereby the associated one of the finger portions 51 is substantially U-shaped for receiving the center portion of the associated one of the slats for inhibiting shifting of the associated one of the slats when one of the slats is being moved.

The finger portions 51 of the clamping assembly 47 comprise a pair of exterior finger portions 56 and a pair of interior finger portions 57. An exterior brace 59 is coupled between the exterior finger portions 56 for maintaining alignment of the exterior finger portions 56 when the exterior finger portions 56 are selectively secured to one of the slats. An interior brace is coupled between the interior finger portions 57 for maintaining alignment of the interior finger portions 57 when the interior finger portions 57 are selectively secured to the associated one of the slats.

The drive assembly 14 comprises a hydraulic system 60 having a hydraulic pump 61, a reservoir 62 and a plurality of rams 63. The hydraulic pump 61 is operationally coupled to the motor assembly 13 so that the motor assembly 13 drives the hydraulic pump 61 for pumping hydraulic fluid through out the hydraulic system 60. The wheel portion 28 of each of the positioning assemblies 25 is in hydraulic communication with hydraulic pump 61 for rotating the wheel portion 28 to propel the base assembly 11 across the floor of the animal pen. The rams 63 of the hydraulic system 60 are coupled to the hydraulic pump 61 for moving desired objects. In the case of the raising assembly 29 of each of the positioning assemblies 25 comprises a ram coupled to one of a pair of sprockets 64. A chain 65 extends from the bottom and around of the sprocket coupled to the ram and extends to the top of the other sprocket and down to connect to the associated one of the end support members 30. As the ram draws the sprockets 64 apart the chain 65 draws the associated one of the end support members 30 up away from the floor of the animal pen to allow for repositioning of the base assembly 11. The control assembly 16 comprises a plurality of the levers 66 being in fluid communication with the hydraulic pump 61 such that actuation of the levers 66 controls the pressure of the hydraulic fluid to desired actuators.

In use, the user uses a fork lift to engage the base assembly 11 to position base assembly 11 in the animal pen. The leg members 21 and the support members are moved into the deployed position. The channel members are coupled to the leg members 21 to allow the dolly wheel 36 to roll around the channel members to facilitate rotation of the frame member 12 with respect to the base assembly 11. Each of the positioning assemblies 25 is coupled to the associated support members. The user then sits in the seating assembly 42 with the control assembly 16 positioned in front of them. The positioning assemblies 25 lift the base assembly 11 and allow the caster assemblies 22 to be removed from the leg members 21 and allow for the base assembly 11 to be moved along the floor of the animal pen. When the base assembly 11 is positioned in the desired location the positioning assemblies 25 lower the base assembly 11 to let the leg members 21 and support members to rest upon the floor of the animal. The control assembly 16 allows the user to rotate the frame member 12 with respect to the base member, actuate the balancing assembly 45 to balance the weight of the slat and actuate the lifting assembly 15 to lift and lower the slats.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slat replacement system for removing damaged slats and inserting new slats for an animal pen, the slat replacement system comprising:
   a base assembly being adapted for resting on a floor of the animal pen;
   a frame member being rotatably coupled to said base assembly;
   a motor assembly being operationally coupled to a drive assembly such that said motor assembly is for actuating said drive assembly, said motor assembly and said drive assembly being coupled to said frame member, said drive assembly being operationally coupled to said base assembly such that said drive assembly rotates said frame member with respect to said base assembly when said drive assembly is actuated by the user;

a lifting assembly being pivotally coupled to said frame member, said lifting assembly being operationally coupled to said drive assembly such that said drive assembly is for pivoting said lifting assembly with respect to said frame member, said lifting assembly being adapted for being coupled to one of the slats for facilitating lifting and moving of one of the slats;

a control assembly being operationally coupled to said drive assembly, said control assembly actuating said drive assembly for controlling rotation of said frame member with respect to said base assembly and pivoting of said lifting assembly with respect to said frame member when said control assembly is actuated by a user;

said base assembly comprising a base plate and a transition cog wheel, said transition cog wheel being coupled to said base assembly, said transition cog wheel being rotatably coupled to said frame member, said drive assembly comprising a rotational cog wheel such that said rotational cog wheel is rotatable with respect to said frame member, said rotational cog wheel of said drive assembly being operationally coupled to said transition cog wheel such that rotation of said rotation cog wheel rotates said frame member with respect to said base plate;

said base assembly comprising a plurality of sets of support members, each of said sets of support members being coupled to said base plate such that one of said sets of support members is positioned oppositely the other of said support members, each of said sets of support members being adapted for engaging the floor of the animal pen for supporting said base plate from the floor of the animal pen; and said base assembly comprising a plurality of leg members, each of said leg members being pivotally coupled to said base plate such that each of said leg members is pivotal between a stored position and a deployed position, each of said leg members being positioned between said sets of support members, each of said leg members being adapted for engaging the floor of the animal pen when each of said leg members is in said deployed position for providing support for said base plate.

2. The slat replacement system as set forth in claim 1, further comprising:

said base assembly comprising a plurality of positioning assemblies, each of said positioning assemblies being coupled to one of said sets of support members, each of said positioning assemblies being for vertically positioning the associated one of said sets of support members with respect to the floor of the animal pen for allowing repositioning of said base plate.

3. The slat replacement system as set forth in claim 2, further comprising:

each of said positioning assemblies comprising a span member, a roller portion and a wheel portion, said span member being coupled to the associated one of said-sets of support members, said roller portion being pivotally coupled to said span member, said wheel portion being rotatably coupled to said span member opposite said roller portion, said wheel portion being operationally coupled to said drive assembly such that said drive assembly rotates said wheel portion for moving said base plate across the floor of the animal pen.

4. The slat replacement system as set forth in claim 3, further comprising:

each of said positioning assemblies comprising a raising assembly, said raising assembly being coupled to said span member of the associated one of said positioning assemblies, said raising assembly being operationally coupled to at least one of said support members of the associated one of said sets of support members such that said raising assembly selectively lifts the associated one of said sets of supports members with respect to the floor in the animal pen, said raising assembly being operationally coupled to said drive assembly such that said drive assembly actuates said raising assembly to vertically adjust the associated one of said sets of support members with respect to the floor of the animal pen when said drive assembly is actuated by the user.

5. The slat replacement system as set forth in claim 1, further comprising:

each of said sets of support members comprising a pair of end support members and a center support member, each of said end support members being pivotally coupled to said base plate such that each of said end support members are pivotal between a deployed position and a stored position, said center support member being coupled to said base plate such that said center support member is positioned between said end support members, said end support members and said center support member being adapted for selectively engaging the floor of the animal pen when said end support members are in the deployed position.

6. The slat replacement system as set forth in claim 1, further comprising:

said base assembly comprising a pair of base channel members and a plurality side channel members, each of said base channel members being coupled to one of said sets of support members, each of said channel members being selectively coupled to at least one of said leg members when said leg members are in the deployed position, said base channel members and said side channel members forming a guide track for receiving a dolly wheel rotatably coupled to said frame member for facilitating rotation of said frame member with respect to said base assembly when said leg members are in the deployed position.

7. The slat replacement system as set forth in claim 1, wherein said control assembly is coupled to said frame member, said control assembly having a deployed position and a stored position, said stored position of said control assembly being defined by a longitudinal axis of said control assembly being positioned substantially parallel to a longitudinal axis of said frame member, said deployed position of said control assembly being defined by the longitudinal axis of said control assembly being substantially perpendicular to the longitudinal axis of said frame member such that said control assembly is adapted for being accessed by the user for controlling the drive assembly when said control assembly is in said deployed position.

8. The slat replacement system as set forth in claim 1, further comprising:

a seating assembly being coupled to said frame member, said seating assembly extending outwardly from said frame member, said seating assembly being adapted for receiving the user for positioning the user adjacent said control assembly.

9. The slat replacement system as set forth in claim 8, further comprising:

said seating assembly comprising a seat frame and a seat member, said seat frame being coupled to said frame member, said seat member being coupled to said seat frame opposite said frame member.

10. The slat replacement system as set forth in claim 1, further comprising:
a balancing assembly being coupled to said frame member opposite said lifting assembly, said balancing assembly being adapted for receiving weights such that said balancing assembly is capable of balancing the weight of one of the slats when said lifting assembly is lifting the associated one of the slats.

11. The slat replacement system as set forth in claim 1, further comprising:
said lifting assembly comprising a lifting frame, said lifting frame being pivotally coupled to said frame member, said lifting frame being operationally coupled to said drive assembly such that said drive assembly pivots said lifting frame with respect to said frame member when said drive assembly is actuated by the user, said lifting frame being adapted for lifting and lowering one of the slats when said lifting frame is pivoted with respect to said frame member.

12. The slat replacement system as set forth in claim 11, further comprising:
said lifting assembly comprising a clamping assembly, said clamping assembly being coupled to an arm portion of said lifting assembly coupled to said lifting frame, said clamping assembly being adapted for engaging one of the slats for securing one of the slats to said lifting assembly for lifting and lowering one of the slats.

13. The slat replacement system as set forth in claim 12, further comprising:
said arm portion of said lifting assembly comprising a sleeve member and a boom member, said sleeve member slidably receiving said boom member such that said boom member is telescopic from said sleeve member, said boom member being operationally coupled to said drive assembly for selectively sliding said boom member with respect to said sleeve member for changing the distance between said frame member and one of the slats when said drive member is actuated by the user.

14. The slat replacement system as set forth in claim 12, further comprising:
said clamping assembly of said lifting assembly comprising a plurality of finger portions and a pivot rod, said finger portions being pivotally coupled to said pivot rod, each of said finger portions being adapted for extending through one of a plurality of slots in one of the slats and engaging a center portion of the associated one of the slats for securing the associated one of the slats to said lifting assembly.

15. The slat replacement system as set forth in claim 14, further comprising:
each of said finger portions of said of clamping assembly comprising a proximal member, a medial member and a distal member, said proximal member being pivotally coupled to said pivot rod of said clamping assembly, said medial member being coupled to said proximal member opposite said pivot rod, said distal member being coupled to said medial member opposite said proximal member such that the associated one of said finger portions is substantially U-shaped for receiving the center portion of the associated one of the slats for inhibiting shifting of the associated one of the slats when one of the slats is being moved.

16. The slat replacement system as set forth in claim 14, further comprising:
said finger portions of said clamping assembly comprising a pair of exterior finger portions and a pair of interior finger portions, an exterior brace being coupled between said exterior finger portions for maintaining alignment of said exterior finger portions when said exterior finger portions are selectively secured to one of the slats, an interior brace being coupled between said interior finger portions for maintaining alignment of said interior finger portions when said interior finger portions are selectively secured to the associated one of the slats.

17. A slat replacement system for removing damaged slats and inserting new slats for an animal pen, the slat replacement system comprising:
a base assembly being adapted for resting on a floor of the animal pen;
a frame member being rotatably coupled to said base assembly;
a motor assembly being operationally coupled to a drive assembly such that said motor assembly is for actuating said drive assembly, said motor assembly and said drive assembly being coupled to said frame member, said drive assembly being operationally coupled to said base assembly such that said drive assembly rotates said frame member with respect to said base assembly when said drive assembly is actuated by the user;
a lifting assembly being pivotally coupled to said frame member, said lifting assembly being operationally coupled to said drive assembly such that said drive assembly is for pivoting said lifting assembly with respect to said frame member, said lifting assembly being adapted for being coupled to one of the slats for facilitating lifting and moving of one of the slats;
a control assembly being operationally coupled to said drive assembly, said control assembly actuating said drive assembly for controlling rotation of said frame member with respect to said base assembly and pivoting of said lifting assembly with respect to said frame member when said control assembly is actuated by a user;
said base assembly comprising a base plate and a transition cog wheel, said transition cog wheel being coupled to said base assembly, said transition cog wheel being rotatably coupled to said frame member, said drive assembly comprising a rotational cog wheel such that said rotational cog wheel is rotatable with respect to said frame member, said rotational cog wheel of said drive assembly being operationally coupled to said transition cog wheel such that rotation of said rotation cog wheel rotates said frame member with respect to said base plate;
said base assembly comprising a plurality of sets of support members, each of said sets of support members being coupled to said base plate such that one of said sets of support members is positioned oppositely the other of said support members, each of said sets of support members being adapted for engaging the floor of the animal pen for supporting said base plate from the floor of the animal pen;
said base assembly comprising a plurality of positioning assemblies, each of said positioning assemblies being coupled to one of said sets of support members, each of said positioning assemblies being for vertically positioning the associated one of said sets of support members with respect to the floor of the animal pen for allowing repositioning of said base plate; and each of said positioning assemblies comprising a span member, a roller portion and a wheel portion, said span member being coupled to the associated one of said sets of support members, said roller portion being pivotally coupled to said span member, said wheel portion being rotatably coupled to said span member opposite said roller portion, said wheel portion being operationally coupled to said drive assembly such that said drive assembly rotates said wheel portion for moving said base plate across the floor of the animal pen.

18. The slat replacement system as set forth in claim 17, further comprising:

each of said positioning assemblies comprising a raising assembly, said raising assembly being coupled to said span member of the associated one of said positioning assemblies, said raising assembly being operationally coupled to at least one of said support members of the associated one of said sets of support members such that said raising assembly selectively lifts the associated one of said sets of supports members with respect to the floor in the animal pen, said raising assembly being operationally coupled to said drive assembly such that said drive assembly actuates said raising assembly to vertically adjust the associated one of said sets of support members with respect to the floor of the animal pen when said drive assembly is actuated by the user.

19. A slat replacement system for removing damaged slats and inserting new slats for an animal pen, the slat replacement system comprising:

a base assembly being adapted for resting on a floor of the animal pen;

a frame member being rotatably coupled to said base assembly;

a motor assembly being operationally coupled to a drive assembly such that said motor assembly is for actuating said drive assembly, said motor assembly and said drive assembly being coupled to said frame member, said drive assembly being operationally coupled to said base assembly such that said drive assembly rotates said frame member with respect to said base assembly when said drive assembly is actuated by the user;

a lifting assembly being pivotally coupled to said frame member, said lifting assembly being operationally coupled to said drive assembly such that said drive assembly is for pivoting said lifting assembly with respect to said frame member, said lifting assembly being adapted for being coupled to one of the slats for facilitating lifting and moving of one of the slats;

a control assembly being operationally coupled to said drive assembly, said control assembly actuating said drive assembly for controlling rotation of said frame member with respect to said base assembly and pivoting of said lifting assembly with respect to said frame member when said control assembly is actuated by a user;

said base assembly comprising a base plate and a transition cog wheel, said transition cog wheel being coupled to said base assembly, said transition cog wheel being rotatably coupled to said frame member, said drive assembly comprising a rotational cog wheel such that said rotational cog wheel is rotatable with respect to said frame member, said rotational cog wheel of said drive assembly being operationally coupled to said transition cog wheel such that rotation of said rotation cog wheel rotates said frame member with respect to said base plate;

said base assembly comprising a plurality of sets of support members, each of said sets of support members being coupled to said base plate such that one of said sets of support members is positioned oppositely the other of said support members, each of said sets of support members being adapted for engaging the floor of the animal pen for supporting said base plate from the floor of the animal pen; and each of said sets of support members comprising a pair of end support members and a center support member, each of said end support members being pivotally coupled to said base plate such that each of said end support members are pivotal between a deployed position and a stored position, said center support member being coupled to said base plate such that said center support member is positioned between said end support members, said end support members and said center support member being adapted for selectively engaging the floor of the animal pen when said end support members are in the deployed position.

20. A method of replacing damaged slats with new slats for an animal pen, the method comprising:

providing a slat replacement system comprising a base assembly being adapted for resting on a floor of the animal pen;

a frame member being rotatably coupled to said base assembly;

a motor assembly being operationally coupled to a drive assembly such that said motor assembly is for actuating said drive assembly, said motor assembly and said drive assembly being coupled to said frame member, said drive assembly being operationally coupled to said base assembly such that said drive assembly rotates said frame member with respect to said base assembly when said drive assembly is actuated by the user;

a lifting assembly being pivotally coupled to said frame member, said lifting assembly being operationally coupled to said drive assembly such that said drive assembly is for pivoting said lifting assembly with respect to said frame member, said lifting assembly being adapted for being coupled to one of the slats for facilitating lifting and moving of one of the slats;

a control assembly being operationally coupled to said drive assembly, said control assembly actuating said drive assembly for controlling rotation of said frame member with respect to said base assembly and pivoting of said lifting assembly with respect to said frame member when said control assembly is actuated by a user;

said base assembly comprising a base plate and a transition cog wheel, said transition cog wheel being coupled to said base assembly, said transition cog wheel being rotatably coupled to said frame member, said drive assembly comprising a rotational cog wheel such that said rotational cog wheel is rotatable with respect to said frame member, said rotational cog wheel of said drive assembly being operationally coupled to said transition cog wheel such that rotation of said rotation cog wheel rotates said frame member with respect to said base plate;

said base assembly comprising a plurality of sets of support members, each of said sets of support members being coupled to said base plate such that one of said sets of support members is positioned oppositely the other of said support members, each of said sets of support members being adapted for engaging the floor of the animal pen for supporting said base plate from the floor of the animal pen;

said base assembly comprising a plurality of leg members, each of said leg members being pivotally coupled to said base plate such that each of said leg members is pivotal between a stored position and a deployed position, each of said leg members being positioned between said sets of support members, each of said leg members being adapted for engaging the floor of the animal pen when each of said leg members is in said deployed position for providing support for said base plate;

said base assembly comprising a plurality of positioning assemblies, each of said positioning assemblies being coupled to one of said sets of support members, each of said positioning assemblies being for vertically positioning the associated one of said sets of support members with respect to the floor of the animal pen for allowing repositioning of said base plate;

each of said positioning assemblies comprising a span member, a roller portion and a wheel portion, said span member being coupled to the associated one of said sets of support members, said roller portion being pivotally coupled to said span member, said wheel portion being rotatably coupled to said span member opposite said roller portion, said wheel portion being operationally coupled to said drive assembly such that said drive assembly rotates said wheel portion for moving said base plate across the floor of the animal pen;

each of said positioning assemblies comprising a raising assembly, said raising assembly being coupled to said span member of the associated one of said positioning assemblies, said raising assembly being operationally coupled to at least one of said support members of the associated one of said sets of support members such that said raising assembly selectively lifts the associated one of said sets of supports members with respect to the floor in the animal pen, said raising assembly being operationally coupled to said drive assembly such that said drive assembly actuates said raising assembly to vertically adjust the associated one of said sets of support members with respect to the floor of the animal pen when said drive assembly is actuated by the user;

each of said sets of support members comprising a pair of end support members and a center support member, each of said end support members being pivotally coupled to said base plate such that each of said end support members are pivotal between a deployed position and a stored position, said center support member being coupled to said base plate such that said center support member is positioned between said end support members, said end support members and said center support member being adapted for selectively engaging the floor of the animal pen when said end support members are in the deployed position;

said base assembly comprising a pair of base channel members and a plurality side channel members, each of said base channel members being coupled to one of said sets of support members, each of said channel members being selectively coupled to at least one of said leg members when said leg members are in the deployed position, said base channel members and said side channel members forming a guide track for receiving a dolly wheel rotatably coupled to said frame member for facilitating rotation of said frame member with respect to said base assembly when said leg members are in the deployed position;

said control assembly being coupled to said frame member, said control assembly having a deployed position and a stored position, said stored position of said control assembly being defined by a longitudinal axis of said control assembly being positioned substantially parallel to a longitudinal axis of said frame member, said deployed position of said control assembly being defined by the longitudinal axis of said control assembly being substantially perpendicular to the longitudinal axis of said frame member such that said control assembly is adapted for being accessed by the user for controlling the drive assembly when said control assembly is in said deployed position;

a seating assembly being coupled to said frame member, said seating assembly extending outwardly from said frame member, said seating assembly being adapted for receiving the user for positioning the user adjacent said control assembly;

said seating assembly comprising a seat frame and a seat member, said seat frame being coupled to said frame member, said seat member being coupled to said seat frame opposite said frame member;

a balancing assembly being coupled to said frame member opposite said lifting assembly, said balancing assembly being adapted for receiving weights such that said balancing assembly is for balancing the weight of one of the slats when said lifting assembly is lifting the associated one of the slats;

said lifting assembly comprising a lifting frame, said lifting frame being pivotally coupled to said frame member, said lifting frame being operationally coupled to said drive assembly such that said drive assembly pivots said lifting frame with respect to said frame member when said drive assembly is actuated by the user, said lifting frame being adapted for lifting and lowering one of the slats when said lifting frame is pivoted with respect to said frame member;

said lifting assembly comprising a clamping assembly, said clamping assembly being coupled to an arm portion of said lifting assembly coupled to said lifting frame, said clamping assembly being adapted for engaging one of the slats for securing one of the slats to said lifting assembly for lifting and lowering one of the slats;

said arm portion of said lifting assembly comprising a sleeve member and a boom member, said sleeve member slidably receiving said boom member such that said boom member is telescopic from said sleeve member, said boom member being operationally coupled to said drive assembly for selectively sliding said boom member with respect to said sleeve member for changing the distance between said frame member and one of the slats when said drive member is actuated by the user;

said clamping assembly of said lifting assembly comprising a plurality of finger portions and a pivot rod, said finger portions being pivotally coupled to said pivot rod, each of said finger portions being adapted for extending through one of a plurality of slots in one of the slats and engaging a center portion of the associated one of the slats for securing the associated one of the slats to said lifting assembly;

each of said finger portions of said of clamping assembly comprising a proximal member, a medial member and a distal member, said proximal member being pivotally coupled to said pivot rod of said clamping assembly, said medial member being coupled to said proximal member opposite said pivot rod, said distal member being coupled to said medial member opposite said proximal member such that the associated one of said finger portions is substantially U-shaped for receiving the center portion of the associated one of the slats for inhibiting shifting of the associated one of the slats when one of the slats is being moved;

said finger portions of said clamping assembly comprising a pair of exterior finger portions and a pair of interior finger portions, an exterior brace being coupled between said exterior finger portions for maintaining alignment of said exterior finger portions when said exterior finger portions are selectively secured to one of the slats, an interior brace being coupled between said interior finger portions for maintaining alignment of said interior finger portions when said interior finger portions are selectively secured to the associated one of the slats;

positioning of base assembly in the animal pen;

moving of said leg members and said support members into said deployed position;

coupling said channel members to said leg members to allow said dolly wheel to roll around said channel members to facilitate rotation of said frame member with respect to said base assembly;

coupling of each of said positioning assemblies to said associated support members;

positioned of the user in said seating assembly with said control assembly positioned in front of the user;

lifting of said bass assembly by said positioning assemblies to allow said caster assemblies to be removed from said leg members and allow for said base assembly to be moved along said floor of said animal pen;

lowering of said base assembly by said positioning assemblies when said base assembly is positioned in the desired location to let said leg members and said support members rest upon the floor of the animal pen;

actuating said control assembly by the user to rotate said frame member with respect to said base member;

engaging said clamping assembly to one of the slat to be removed;

actuating said balancing assembly to balance the weight of the slat engaged by said clamping assembly;

actuating said lifting assembly to lift the slat engaged by said clamping assembly;

actuating said control assembly to rotate said frame member with respect to said base member to position the slat to be removed over a desired location for disposal of the slat;

lowering of said clamping assembly to position the slat in the desired location and disengaging said clamping assembly from the slat;

raising of said clamping assembly and positioning of said clamping assembly over a new slat to replace the removed slat;

engaging said clamping assembly to the new slat and lifting said clamping assembly to lift the new slat;

rotating said frame member to positioned the new slat over the area left vacant by the removed slat;

lowering said clamping assembly to position the new slat in the desired area;

disengaging said clamping assembly from the new slat; and repeating replacement process until all old slats are replaced with new slats.

\* \* \* \* \*